_United States Patent Office_

3,424,696
Patented Jan. 28, 1969

3,424,696
METHOD FOR REGENERATING CATALYSTS USED FOR RECONVERTING WORN SOLUTIONS IN THE CYCLIC METHOD OF MANUFACTURE OF HYDROGEN PEROXIDE
Michel Coingt, Vizille, France, assignor to Oxysynthese
No Drawing. Filed Nov. 22, 1965, Ser. No. 509,208
Claims priority, application France, Dec. 30, 1964, 359
U.S. Cl. 252—412
Int. Cl. B01j *11/02*
7 Claims

ABSTRACT OF THE DISCLOSURE

A method is provided for regenerating catalysts based on sodium aluminosilicate used for reconverting worn solutions of an anthraquinone in an organic solvent, which have been used in the cyclic method of manufacture of hydrogen peroxide, wherein the sodium aluminosilicate reconversion catalysts are treated with a diluted solution of hydrogen peroxide.

---

The object of this invention is a method for regenerating catalysts used for reconverting worn solutions of an anthraquinone in an organic solvent, which have been used in the cyclic method of manufacture of hydrogen peroxide.

The commercial method of cyclic manufacture of hydrogen peroxide involves the following steps: catalytic hydrogenation of a solution of an anthraquinone in an organic solvent, to get a solution of the corresponding anthrahydroquinone or anthraquinhydrone; separation of the catalyst from the resulting solution; reoxidation of the solution to regenerate the anthraquinone and produce hydrogen peroxide; extraction of the hydrogen peroxide with water; separation of the aqueous hydrogen peroxide extract from the anthraquinone solution; recirculation of the organic solution to the catalytic hydrogenation stage of another production cycle, after incorporating the said separated catalyst.

The catalytic reduction and reoxidation of an anthraquinone dissolved in an organic solvent are accompanied by secondary reactions which more or less rapidly convert the anthraquinone to degradation products, which cease to take part in the reduction and reoxidation reactions leading to the formation of hydrogen peroxide.

To regenerate active anthraquinone from such degradation products in worn solutions, the said solutions are usually subjected to a regenerating treatment. Such a treatment is described in British Patent No. 896,346 of Dec. 5, 1958: it consists in heating the worn solution in the presence of a catalyst based on sodium aluminosilicate at 100°–200° C., to reconvert the degradation products into anthraquinone or tetrahydroanthraquinone.

Other reconverting catalysts based on silicates are described in British Patent No. 928,784 of Jan. 22, 1959.

In a continuous hydrogen peroxide production cycle, this reconverting treatment is incorporated into the said cycle, between the hydrogen peroxide extraction stage and the catalytic hydrogenation stage. However, it is well known that the life of reconverting catalysts is relatively short.

The object of this invention is therefore a method for regenerating worn reconverting catalysts of the above type, consisting in treating the worn catalysts with a dilute solution of hydrogen peroxide.

According to a first embodiment of the invention, hydrogen peroxide is used as the solution of regenerated anthraquinone and hydrogen peroxide obtained in the reoxidation stage of the cyclic method of manufacture of hydrogen peroxide; the range of temperatures is about 130°–160° C., preferably about 140°–150° C.

According to another embodiment of the invention, hydrogen peroxide is used as a water solution, e.g. from the product of the water extraction stage of the cyclic method of manufacture of hydrogen peroxide; the temperature is the boiling temperature of the extract, i.e. about 100° C.; and the worn catalyst is preferably subjected, before regeneration, to a previous washing with the solvent, followed by steaming, and after regeneration to steam drying.

According to a variation of the method of the invention, regeneration is effected in situ, i.e. without removing the catalyst from the reconverting cycle. For this purpose, the stream of worn solution may be deflected and replaced with a stream of solution from the reoxidation stage; after an adequate period of time, the stream of worn solution is reinstated.

The following examples are given to illustrate the invention, and are not meant to limit its scope.

In those examples, the activity of the catalyst is tested as follows:

40 g. of reconverting catalyst are brought into contact with 400 cc. of worn solution, with stirring, at 145° C.

The evolution of the worn solution is followed by analysing small samples of 2 cc. after 10, 30 and 60 minutes contact.

The raise of the active anthraquinone content is a measure of the activity of the catalyst.

The solution tested is a worn solution containing 2-ethyl-anthraquinone (EAQ) and its tetrahydrogenated-ring derivative, tetrahydro-2-ethyl-anthraquinone (HEAQ), both forms generating hydrogen peroxide, as well as the degradation products of those anthraquinones, the amount of the latter being about 40 g./l.

The activity of the fresh catalyst is shown in Table I hereafter.

TABLE I

| | HEAQ, g./l. | EAQ, g./l. | Total, g./l. | Gain Δ, g./l. |
|---|---|---|---|---|
| Initial worn solution | 52.5 | 12.7 | 65.2 | |
| After 10 min. reconverting | 56.9 | 13.5 | 70.4 | +5.2 |
| After 30 min | 58.0 | 13.9 | 71.9 | +6.7 |
| After 60 min | 58.3 | 13.65 | 71.95 | +6.75 |

EXAMPLE 1

The activity of the worn catalyst is shown in Table II.

TABLE II

| | HEAQ, g./l. | EAQ, g./l. | Total, g./l. | Gain Δ, g./l. |
|---|---|---|---|---|
| Initial worn solution | 53.70 | 11.30 | 65.0 | |
| After 10 min | 53.70 | 11.30 | 65.0 | 0 |
| After 30 min | 53.70 | 11.30 | 65.0 | 0 |
| After 60 min | 53.90 | 11.50 | 65.4 | +0.4 |

40 g. of this catalyst are brought into contact with 400 cc. of reoxidized solution (solution of regenerated anthraquinone and hydrogen peroxide obtained in the reoxidation stage of the cyclic method of manufacture of hydrogen peroxide) containing 7.5 g./l. $H_2O_2$, with stirring, at 145° C., for 1 hour.

After this treatment, the regenerated catalyst is washed with an aromatic solvent and drained; the solvent is steam-distilled; the catalyst is dried at 120° C. for 2 hours, then subjected to the reconversion test.

The activity of the regenerated catalyst is shown in Table III.

TABLE III

|  | HEAQ, g./l. | EAQ, g./l. | Total, g./l. | Gain Δ, g./l. |
|---|---|---|---|---|
| Initial worn solution | 53.0 | 11.34 | 64.3 | --------- |
| After 10 min | 54.0 | 11.50 | 65.5 | +1.2 |
| After 30 min | 54.0 | 11.50 | 65.5 | +1.2 |
| After 60 min | 54.8 | 11.50 | 66.3 | +2.0 |

EXAMPLE 2

The worn catalyst has the following activity (Table IV):

TABLE IV

|  | HEAQ, g./l. | EAQ, g./l. | Total, g./l. | Gain Δ, g./l. |
|---|---|---|---|---|
| Initial worn solution | 53.0 | 13.3 | 66.3 | --------- |
| After 10 min | 53.0 | 13.3 | 66.3 | 0 |
| After 30 min | 52.9 | 13.3 | 66.2 | −0.1 |
| After 60 min | 53.1 | 13.2 | 66.3 | 0 |

40 g. of this catalyst are brought into contact with 400 cc. of reoxidized solution containing 8.65 g./l. $H_2O_2$, with stirring, at 145° C., for 1 hr.

After the treatment, the regenerated catalyst is drained and subjected to the reconversion test.

The activity of the regenerated catalyst is shown in Table V.

TABLE V

|  | HEAQ, g./l. | EAQ, g./l. | Total, g./l. | Gain Δ, g./l. |
|---|---|---|---|---|
| Initial worn solution | 53.0 | 13.3 | 66.3 | --------- |
| After 10 min | 55.1 | 13.7 | 68.8 | +2.5 |
| After 30 min | 55.1 | 13.7 | 68.8 | +2.5 |
| After 60 min | 54.90 | 13.6 | 68.5 | +2.2 |

EXAMPLE 3

The worn catalyst is subjected to the following treatment:

40 g. catalyst are brought into contact with 400 cc. hydrogen peroxide solution in water (7.5 g./l. $H_2O_2$), with stirring, at refluxing temperature, i.e. 100° C., for 1 hr. The regenerated catalyst is washed in water, then dried for 2 hrs. at 120° C. The activities of the worn and regenerated catalysts are shown in Tables VI and VII hereafter.

TABLE VI.—ACTIVITY OF WORN CATALYST

|  | HEAQ, g./l. | EAQ, g./l. | Total, g./l. | Gain Δ, g./l. |
|---|---|---|---|---|
| Initial worn solution | 52.7 | 12.3 | 65.0 | --------- |
| After 10 min | 52.3 | 12.3 | 64.5 | −0.4 |
| After 30 min | 52.5 | 12.3 | 64.8 | −0.2 |
| After 60 min | 52.7 | 12.4 | 65.1 | +0.1 |

TABLE VII.—ACTIVITY OF REGENERATED CATALYST

|  | HEAQ, g./l. | EAQ, g./l. | Total, g./l. | Gain Δ, g./l. |
|---|---|---|---|---|
| Initial worn solution | 52.7 | 12.3 | 65.0 | --------- |
| After 10 min | 54.0 | 12.3 | 66.3 | +1.3 |
| After 30 min | 54.0 | 12.3 | 66.3 | +1.3 |
| After 60 min | 54.8 | 12.3 | 67.1 | +2.1 |

What I claim is:

1. A method for the regeneration of catalysts based on sodium aluminosilicate which effect the reconversion of degradation products in worn solutions used in the cyclic method of manufacture of hydrogen peroxide, in which said sodium aluminosilicate reconversion catalysts are treated with a dilute solution of hydrogen peroxide.

2. The method according to claim 1 in which the solution of hydrogen peroxide is a solution of regenerated anthraquinone and hydrogen peroxide obtained in the reoxidation stage of the cyclic method of manufacture of hydrogen peroxide, and the treatment occurs in the temperature range 130°–160° C.

3. The method according to claim 2 in which the treatment occurs in the temperature range 140°–150° C.

4. The method according to claim 1 in which the hydrogen peroxide solution is a water solution.

5. The method according to claim 1 in which the solution of hydrogen peroxide is a water solution obtained from the product of the extraction stage of the cyclic method of manufacture of hydrogen peroxide, and the treatment occurs at the boiling temperature of the said extract.

6. The method according to claim 5 in which the catalysts are subjected to previous washing with a solvent, followed by steam distillation, and dried after regeneration.

7. The method according to claim 2 in which the regeneration of the worn catalysts occurs in situ in the reconversion cycle, through temporary deflection of the stream or worn solution and replacement of the same with a stream of solution from the reoxidation stage.

References Cited

UNITED STATES PATENTS

| 2,692,240 | 10/1954 | Sprauer | 252—412 |
| 2,886,416 | 5/1959 | Cox et al. | 23—207 |
| 3,098,714 | 7/1963 | Kabisch et al. | 23—207 |
| 3,112,278 | 11/1963 | Jenney et al. | 252—420 |
| 3,132,001 | 5/1964 | Denaeyer et al. | 23—207 |
| 3,295,928 | 1/1967 | Howe et al. | 23—207 |

DANIEL E. WYMAN, *Primary Examiner.*

C. F. DEES, *Assistant Examiner.*

U.S. Cl. X.R.

252—420, 455